United States Patent
Selleck

(10) Patent No.: US 11,176,768 B2
(45) Date of Patent: Nov. 16, 2021

(54) METHOD AND APPARATUS FOR OBTAINING RESPONSES FROM USERS VIA COMMUNICATION SYSTEM

(71) Applicant: Voice.Vote SPC, Bellevue, WA (US)

(72) Inventor: Mark Selleck, Bellevue, WA (US)

(73) Assignee: VOICE.VOTE SPC, Bellevue, WA (US)

(*) Notice: Subject to any disclaimer, the term of this patent is extended or adjusted under 35 U.S.C. 154(b) by 246 days.

(21) Appl. No.: 16/112,267

(22) Filed: Aug. 24, 2018

(65) Prior Publication Data

US 2019/0066427 A1 Feb. 28, 2019

Related U.S. Application Data

(60) Provisional application No. 62/549,477, filed on Aug. 24, 2017, provisional application No. 62/549,458, (Continued)

(51) Int. Cl.
*G07C 13/00* (2006.01)
*H04W 4/60* (2018.01)
(Continued)

(52) U.S. Cl.
CPC .............. *G07C 13/00* (2013.01); *G06Q 10/00* (2013.01); *G06Q 30/0201* (2013.01);
(Continued)

(58) Field of Classification Search
CPC . G06Q 30/02; G06F 3/04842; G06F 3/04886; G09B 5/14; G09B 7/06;
(Continued)

(56) References Cited

U.S. PATENT DOCUMENTS

| | | | |
|---|---|---|---|
| 6,873,688 B1* | 3/2005 | Aarnio | G06Q 30/02 379/92.01 |
| 9,754,318 B1 | 9/2017 | Spies et al. | |

(Continued)

FOREIGN PATENT DOCUMENTS

WO 2015006718 A1 1/2015

OTHER PUBLICATIONS

International Search Report and Written Opinion for International Application No. PCT/US18/47989 dated Sep. 20, 2019, 16 pages.
(Continued)

*Primary Examiner* — Thien M Le
*Assistant Examiner* — Tae W Kim
(74) *Attorney, Agent, or Firm* — Moreno IP Law LLC

(57) ABSTRACT

In an embodiment, a new action request is received by the data manager from any of the plurality of users and stored in the data store. The data manager provides multiple actions requests to at least some of the plurality of users and, thereafter, receives responses from responsive users. The data manager then stores the responses (optionally, with a time stamp) in the data store in a manner such that the responses are associated with corresponding ones of the responsive users. In response to receiving a request for information regarding the responses, the data manager can generate the requested information, which may comprise aggregated or individual data, and provide such information to a requesting user. The request for information may include geographic boundaries to be used in providing the requested information. In a preferred embodiment, the geographic boundaries may correspond to one or more electoral districts.

14 Claims, 10 Drawing Sheets

Related U.S. Application Data filed on Aug. 24, 2017, provisional application No. 62/549,459, filed on Aug. 24, 2017, provisional application No. 62/549,479, filed on Aug. 24, 2017.

(51) Int. Cl.

| | |
|---|---|
| *H04W 4/021* | (2018.01) |
| *H04W 4/30* | (2018.01) |
| *G06Q 50/00* | (2012.01) |
| *G06Q 30/02* | (2012.01) |
| *G06Q 10/00* | (2012.01) |
| *G06Q 50/26* | (2012.01) |
| *H04L 29/08* | (2006.01) |

(52) U.S. Cl.
CPC .............. *G06Q 50/01* (2013.01); *G06Q 50/26* (2013.01); *H04W 4/021* (2013.01); *H04W 4/30* (2018.02); *H04W 4/60* (2018.02); *H04L 67/12* (2013.01)

(58) Field of Classification Search
CPC ............ H04L 12/1813; H04L 12/1859; H04L 12/189; H04L 51/04; H04L 51/38; H04L 67/04; H04L 67/20; H04L 67/26; H04M 1/72544; H04M 1/72547; Y10S 707/99931; Y10S 707/99933

USPC ........................................................ 235/386
See application file for complete search history.

(56) References Cited

U.S. PATENT DOCUMENTS

| | | |
|---|---|---|
| 2003/0046140 A1 | 3/2003 | Callahan et al. |
| 2006/0064429 A1 | 3/2006 | Yao |
| 2010/0088156 A1 | 4/2010 | Wilson |
| 2012/0246580 A1 | 9/2012 | Bouverat |
| 2013/0339091 A1 | 12/2013 | Humay |
| 2016/0127289 A1 | 5/2016 | Papa et al. |
| 2017/0116627 A1 | 4/2017 | Fedosseev et al. |
| 2017/0140374 A1 | 5/2017 | O'Brien et al. |
| 2017/0237717 A1 | 8/2017 | Starosielsky et al. |

OTHER PUBLICATIONS

International Search Report and Written Opinion for International Application No. PCT/US18/47982 dated Nov. 6, 2018, 8 pages.
Supplementary European Search Report for European Pat. App. No. 18901936 dated Feb. 24, 2021, 9 pages.

* cited by examiner

| ACTION REQUEST ID | CREATOR | CREATOR ORG. | CREATION DATE | INSTANCE ID | IMAGE LOCATION | LANGUAGE | TAGS |
|---|---|---|---|---|---|---|---|
| 12A4C | James Dean | CNN | 02/15/18 | 6NJHG7G | Data:image... | English | POLITICS |
| F2390 | Chris Rock | -- | 05/22/18 | HG4N92F | Data:image... | English | MLB |
| API Y45H | Dean Smith | DNC | 07/30/18 | DW5G9D | -- | English | GOVT REGISTRATION |

| ACTION REQUEST | ACTION 1 | ACTION 2 | ACTION 3 | ACTION 4 | ACTION 5 |
|---|---|---|---|---|---|
| Should the electoral college be abolished? | Yes | No | Unsure | | |
| Who's your pick to win the World Series? | Chicago Cubs | Boston Red Sox | Cleveland Indians | Houston Astros | Los Angeles Dodgers |
| VOTER REGISTRATION STATUS | Registered | Eligible, Unregistered | Eligible, Unregistered | Ineligible | |

FIG. 3B

| INSTANCE ID | REFERRING SOURCE | USER INDEX | TIME STAMP | RESPONSE |
|---|---|---|---|---|
| 6NJHG7G | cnn.com | <dd> | 2018-10-30 T 10:45 UTC | Yes |
| HG4N92F | chicagotribune.com | <ee> | 2018-08-05 T 7:23 UTC | Chicago Cubs |
| DW5G9D | NY Times | <ff> | 2018-06-09 T 11:18 UTC | Cleveland Indians |
| ... | | | | |

FIG. 3C

| | TODAY | WEEK | MONTH | YEAR | UNITED STATES ▼ | COMPLETED | ◯ NO | SEARCH | |
|---|---|---|---|---|---|---|---|---|---|

| | | QUERY | BY | ORG. | CREATED | POPULARITY |
|---|---|---|---|---|---|---|
| ALL | FAVORITES | | | | | |
| ARTS & ENTERTAINMENT | | How do you rate the movie La La Land? | Ann Able | NY Times | 06/03/17 | ☐☐☐☐☐ |
| CULTURE | | What color is this dress? | Sam Smith | | 07/13/17 | ☐☐☐☐☐ |
| BOOKS | | Is the President doing a good job? | Joe Jones | ACLU | 10/27/17 | ☐☐☐☐☐ |
| COMEDY | | Do you support concealed carry laws? | Pat Peters | NRA | 11/07/17 | ☐☐☐☐☐ |
| MOVIES | | • • • | | | | |
| MUSIC | | | | | | |
| TV | | | | | | |
| BUSINESS | | | | | | |
| ENVIRONMENT | | | | | | |
| LIFESTYLE | | | | | | |
| RELIGION | | | | | | |
| SCIENCE | | | | | | |

NEW QUERY

FIG. 10

METHOD AND APPARATUS FOR OBTAINING RESPONSES FROM USERS VIA COMMUNICATION SYSTEM

CROSS-REFERENCE TO RELATED APPLICATION

The instant application claims the benefit of Provisional U.S. Patent Application Ser. No. 62/549,458 entitled "AUDIENCE INSIGHTS: AUGMENTING AND ANALYZING QUERY RESULTS WITH DEMOGRAPHICS, GEOGRAPHY AND OTHER DATA," filed Aug. 24, 2017; and claims the benefit of Provisional U.S. Patent Application Ser. No. 62/549,459 entitled "TARGETING CONTENT TO EXPLICIT, USER-PROVIDED DATA INCLUDING QUERY RESPONSES," filed Aug. 24, 2017; and claims the benefit of Provisional U.S. Patent Application Ser. No. 62/549,477 entitled "AGGREGATED MULTI-PARTY, MULTI MIXED-MEDIA QUERY AND DATA COLLECTION WITH PARTY-SPECIFIC SUBTOTALS," filed Aug. 24, 2017; and claims the benefit of Provisional U.S. Patent Application Ser. No. 62/549,479 entitled "SINGLE DESTINATION TO VIEW EXISTING SURVEYS AND CREATE NEW ONES," filed Aug. 24, 2017, the teachings of which prior applications are incorporated herein by this reference.

The instant application is also related to U.S. patent application entitled "METHOD AND APPARATUS FOR DISCONNECTION OF USER ACTIONS AND USER IDENTITY", filed on even date herewith.

FIELD

The instant disclosure relates generally to communication systems such as polling or survey systems and, in particular, to techniques for obtaining responses from users in such systems.

BACKGROUND

Given the ubiquity of Internet and World Wide Web technologies, the opportunity to beneficially use such technologies for on-line polling or survey systems has been recognized for a number of years. Indeed, on-line, computer implemented polling or survey systems currently exist in a variety of forms. However, numerous shortcomings with existing systems have prevented realization of the full potential of on-line polling or survey techniques.

Existing systems generally fall into one of two categories: general-purpose survey offerings that allow any pollster to create a survey to ask one or more questions of an audience provided by the pollster, and offerings that provide or find audiences for pollsters, such as online survey panels that typically include known users who volunteer to answer surveys, often for an incentive. While survey panel vendors maintain information about their panelists, that data is used to target surveys to the desired audience, not to augment survey results. No existing general-purpose on-line computer-implemented survey technology augments survey results with additional data, such as demographics and geography. Therefore, no existing general-purpose on-line survey technologies provide any insight beyond what can be gained from the questions asked and responses given in the survey.

Similarly, online rating systems are a type of survey, and many providers of online reviews maintain persistent identities with data about each individual. However, these technologies do not allow users to view additional data (even if it exists) beyond the review results. Systems are known in which persistent user profiles are maintained, and market research customers are able to view aggregated results across surveys. However, these are not general-purpose survey systems and do not allow any user to ask any question of any audience.

In addition, there is no existing on-line computer-implemented survey technology where anyone can create a question on any topic and that tallies or displays results by electoral district or political boundaries, such as U.S. Congressional Districts. More broadly, most public opinion surveys (including telephone-based surveys) do not tally or display results by electoral districts due to the considerable expense involved, as every electoral district would require a separate poll, and a well-designed probability poll costs approximately $100,000. Consequently, for example, none of the 535 U.S. Congressional Representatives or 7,387 State Legislative Representatives have meaningful data about their constituents' opinions, nor do their respective constituents. Thus, gaps exist in effective representation and accountability. Of course, people often express their opinions on social media and in online comment threads, however, these cannot be accurately tallied, much less by electoral districts.

While online voting systems do exist, they do not lend themselves to the needs of surveys and market research— they are designed for the particular requirements of elections, and do not allow any user to create a question, nor augment results with demographics and other useful data.

Online surveys are inexpensive relative to traditional means of assessing public opinion, so market researchers would much prefer to use online surveys. However, online surveys cannot leverage well-known and trusted techniques which leverage probability (random) samples to infer the opinions of a larger population. There is no national list of email addresses from which respondents could be sampled, and there is no standard convention for email addresses, as there is for phone numbers, that would allow random sampling. Because random sampling is not possible, results cannot be extrapolated to larger populations with known margins of error. Likewise, there is no way to reach everyone online, much less with a known or equal chance of being selected. Because of these limitations in the way online technologies work, it is impossible to obtain random samples of the online population, and therefore impossible to conduct probability polls of the online population.

Instead, existing online survey solutions generally rely on small panels of respondents—known individuals that agree to respond to surveys, typically for an incentive. Panel surveys have many limitations: one cannot use probability statistics to project results to larger populations with known margins of error; only panelists can respond; very few people participate in online panels, so results can rarely be broken down by meaningful subsets or geographies; and these "professional respondents" do not necessarily provide a representative cross-section of the population.

Even when public opinion and other survey data exists, existing survey technologies do not offer a mechanism to analyze results across surveys by different pollsters. If the same person responds to two different surveys from two different pollsters, the surveys are independent from one another and results cannot be viewed or analyzed across both surveys. Relatedly, despite the myriad survey activities that occur every day, there currently is no destination, such as a website or mobile application, where one can browse or search a collection of existing surveys, on any topic, directly create a new survey if the desired survey does not exist and publish it on the same website or mobile application. Likewise, there is no mechanism where citizens can go to express their opinion on any topic, have their response accurately tallied with other constituents, and view results.

Further still, the use of online technologies to develop insights into potential audiences for targeted distribution of content is known. The advertising industry is premised on targeting content to the most receptive audience. Despite the widespread use of targeted content, many problems still exist including a lack of accuracy of data used to target content, the inability for users to update such data, limited criteria for selecting an audience, and difficulty in ensuring delivery to targeted individuals.

Therefore, advances in the technology of on-line, computer-implemented survey technologies that address the shortcomings of existing systems would be a welcome advance in the state of the art.

SUMMARY

The instant disclosure describes techniques that address the above-noted shortcomings. In various embodiments, a communication system comprises a communication network and a plurality of devices operatively connected to the communication network supporting communication between a corresponding plurality of users. A data manager is operatively connected to the communication network and implements a data store comprising, in some embodiments, data corresponding to included users (i.e., users having associated data in the data store) of the plurality of users and, in other embodiments, data concerning a plurality of action requests presented to the at least some of the plurality of users.

In an embodiment, a new action request is received by the data manager from any of the plurality of users and stored in the data store. The data manager also provides the new action request to at least some of the plurality of users and, thereafter, receives responses from responsive users. The data manager then stores the responses (optionally, with a time stamp) in the data store in a manner such that the responses are associated with corresponding ones of the responsive users. In response to receiving a request for information regarding the responses, the data manager can generate the requested information, which may comprise aggregated or individual data, and provide such information to a requesting user. The information provided may include or be provided in context of geographic information including administrative boundaries (countries, states, counties, municipalities, etc.). In a preferred embodiment, the geographic boundaries may correspond to one or more political or electoral districts.

In an embodiment, the data manager receives additional information regarding a user and stores the additional information (optionally, once again, with a time stamp) in the data store in a manner such that the additional data is associated with the user. Preferably, access to the responses and/or additional data for a given user in the data store is limited to that user and the data manager. Preferably, the data manager may authenticate at least some of the additional data and/or responses, or authenticate the identity of a user based on at least some of the additional data and/or responses. Such additional information may be received from the user him/herself, from one of the responsive users, or from a third-party device or interface operatively connected to the communication network.

In an embodiment, the data manager receives information defining an audience from a submitting user, which information includes criteria based on the responses and/or additional data in the data store. A requesting user may provide a request for information concerning the audience and the data manager can generated the requested information and provide it to the requesting user. Further still, the data manager may receive content from a content provider and, thereafter, provide the content to the audience.

In an embodiment, the data manager receives, from a requesting user, a subscription request for information concerning action requests implemented by the data manager. The subscription request includes subscription criteria that may include an identification of a user of the plurality of users or a keyword.

In an embodiment, where a new action request has been received and stored, the data manager may provide a user-deployable mechanism corresponding to the new action request, which mechanism may be provided to other users.

In an embodiment, the data manager may generate a user interface comprising at least a portion of the information concerning the plurality of action requests stored in the data store and provide the information to one or more of the plurality of devices. Thereafter, the data manager receives, from a user, an indication to reuse a selected action request. In return, the data manager creates a new instance of the selected action request. The instance of the selected action request is associated with the user. The data manager then provides, to the user, a user-deployable mechanism also associated with the instance of the selected action request. Supported by the user-deployable mechanism, the data manager receives responses from responding users and stores the responses in the data store in a manner such that the responses are associated with the instance of the selected action request. Information regarding the responses to the user's instance of the selected action request may be provided to that user or to any other user. Further still, information regarding the responses to a plurality of instances (or subset thereof) of the selected action request may be provided to any user.

In yet another embodiment, variable options for viewing reports based on the data associated with included users in the data store are provided to a user. Each of the variable options corresponds to an attribute or a type of data in the data store, for example, specific data elements concerning user demographics. In turn, the data manager receives an indication of a selected variable option and it is determined whether the user's data in the data store includes a value for the attribute or type of data corresponding to the selected variable option. When the user's data does include such a value, a report according to the selected variable option (i.e., the attribute or type of data in the user action data store) is provided to the user via the communication network. On the other hand, when the user's data does not include such a value, then a request to provide a value for the attribute or type of data corresponding to the selected variable option is sent to the user. Thereafter, the requested value is received by the data manager and stored in the data store according to the attribute or type of data corresponding to the selected variable option. Thereafter, the report according to the selected variable option is provided to the user.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIGS. 3A-3C are illustrations of data as stored in a data store in accordance with the instant disclosure;

FIGS. 10 and 11 are examples of screenshots in accordance with various embodiments of the teachings of the instant disclosure.

DETAILED DESCRIPTION OF THE PRESENT EMBODIMENTS

Figure 1:
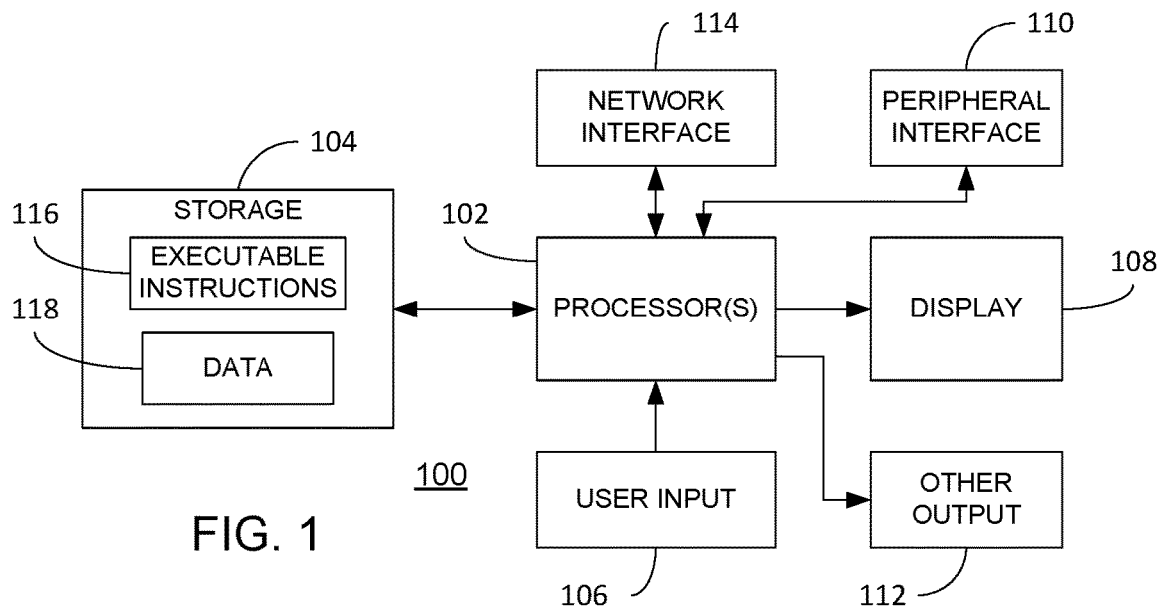
FIG. 1 is a block diagram of an example of a processing device that may be used to implement the teachings of the instant disclosure.

FIG. 1 illustrates a representative processing device 100 that may be used to implement the teachings of the instant disclosure. The processing device 100 may be used to implement, for example, one or more components of the system 200, as described in greater detail below. Regardless, the processing device 100 comprises a processor 102 coupled to a machine-readable storage component 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, database and corresponding database management system (DBMS), etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. Though the one or more user input devices 106, display 108, peripheral interface 110, other output devices 112 and the network interface 114 are illustrated as being separately connected to or in communication with the processor 102, those having skill in the art will appreciate that the illustrated connections can be implemented by one or more communication busses and, further, that such busses may permit communication between the various components 104-114. The user input device 106 may comprise any mechanism for providing user input (such as inputs specifying user data, action requests, etc. as described below) to the processor 102. For example, the user input device 106 may comprise a keyboard, a mouse, a touch screen (as part of the display 108), microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Generally, implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices (scanners, barcode readers, etc.) or any other input source (including other, similar processing devices) used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
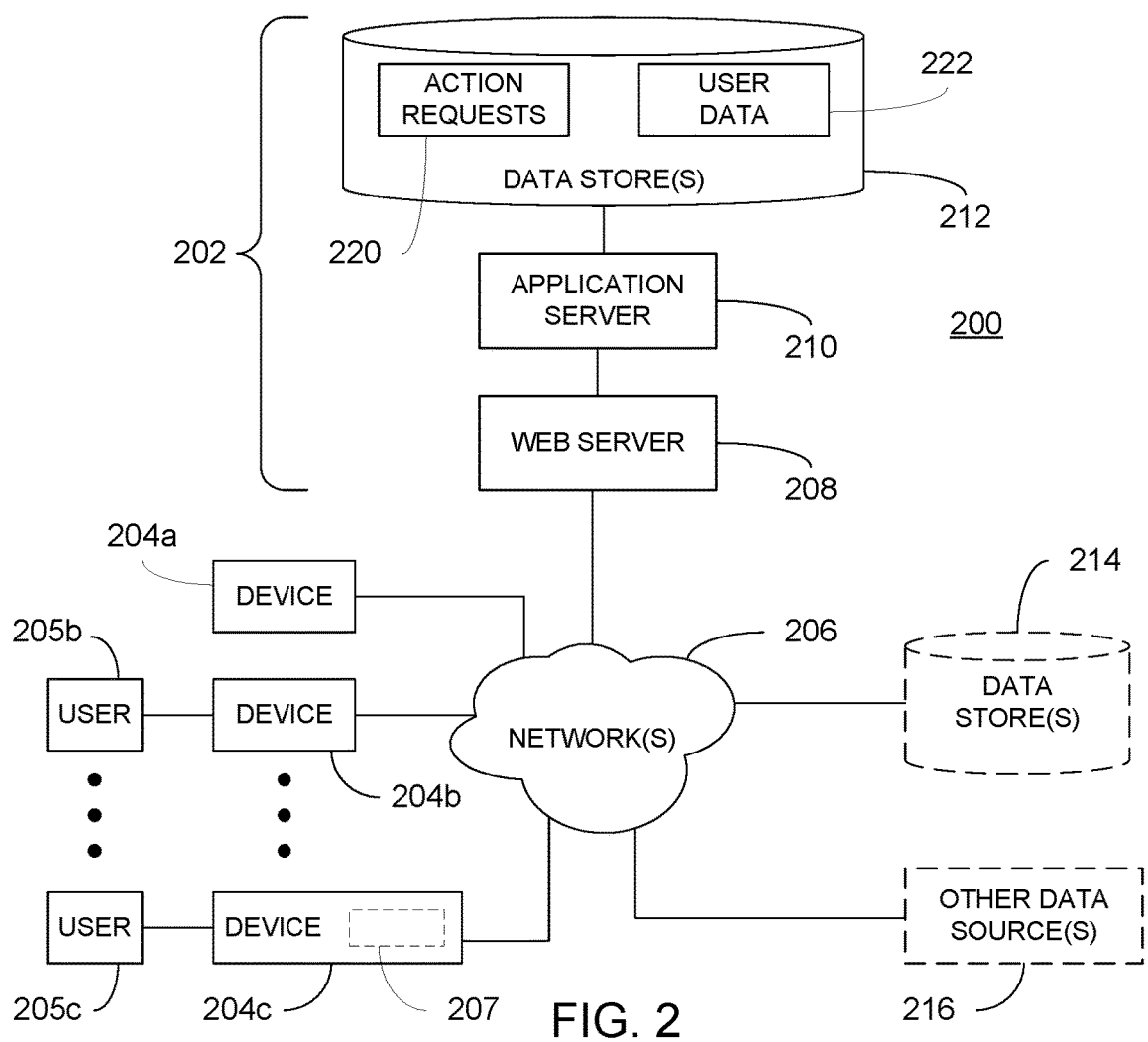
FIG. 2 is a block diagram of a communication system in accordance with the teachings of the instant disclosure.

Referring now to FIG. 2, a communication system 200 in accordance with the instant disclosure is shown. Specifically, the system 200 comprises a data manager 202 operatively connected to and in communication with a communication network 206, Additionally, a plurality of devices 204 are also operatively connected to and in communication with the communication network 206. As described in greater detail below, the data manager 202 may comprise one or more processing device (as described above relative to FIG. 1) in the form of server computers, database servers or other types of computing devices as known in the art, particularly in connection with, for example, the implementation of websites and/or data stores. In an embodiment, the devices 204b-c may comprise processing devices deployed for the use of individual users 205b-c, such as home-use desktop computers, laptop computers or the like. Alternatively, the devices 204b-c may comprise mobile computing devices such as tablet or handheld computers, mobile telephones and the like. Although one-to-one relationships between users 205b-c and devices 204b-c are illustrated in FIG. 2, this is not a requirement as an individual user may operate multiple devices or a single device may be used to support multiple users. Further still, the devices 204 may comprise processing devices 204a that operate independently of a user, as in the case of a computer or the like capable of operating on behalf of one or more users. In an embodiment, such devices may communicate with the data manager 202 via a suitable application programming interface (API), as known in the art. The communication network 206 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the communication network 206 need not be a wired network only, and may comprise wireless network elements, as known in the art, capable of communicating with wireless devices.

It is noted that instances of users 205 communicating with the data manager 202 and vice versa may be described below. Where this phrasing is employed, it is done so for ease of description and it is understood that users 205 communicate with the data manager 202 via corresponding devices 204.

In the illustrated embodiment, the data manager 202 may comprise a web server 208, an application server 210 and a data store 212. As known in the art, the web server 208 may comprise one or more processing devices and corresponding software used to serve content (e.g., respond to requests for content, receive data from connected devices, implement graphical user interfaces, etc.) on the World Wide Web. Similarly, the application server 210 may comprise one or more computing devices and corresponding software used to implement functions that support the operation of the web server 208, including the various processing techniques described herein. The data store 212 may comprise, in an embodiment, one or more processing devices and suitable database management system (DBMS) used to implement the data store as described below. In operation, for example, the web server 208 communicates with the devices 204 via the communication network 206 and may provide an interface that permits devices 204 to provide data (such as new action requests, additional data, requests for information, etc. as described below) that is then processed by the application server 210. In some instances, the application server 210 causes data to be stored in or retrieved from the data store 212, as further described below. Where data is to be provided back to one or more of the devices 204, the web server 208 obtains the necessary data from the application server 210 and communicates the data to the relevant devices 204.

In an embodiment, at least a portion of the data handled by the application server 210 may be stored in locations accessible by the data manager 202 only through the communication network 206. For example, one or more data stores 214, operated by a third-party data storage provider as known in the art, may be used for this purpose. Alternatively, a data store 207 may be provided in a given device 204c using the device's local machine-readable storage component(s). As further shown in FIG. 2, data employed by the data manager 202 may be obtained from other data sources 216. As described below, such other data sources 216 may include the data stores of third-parties (similarly implemented as described above) having additional data about various ones of the users 205. In an embodiment, the other data sources 216 may communicate with the data manager via an API.

As shown in FIG. 2, in an embodiment, the data store 212 may include a plurality of action requests 220 and user data 222. As used herein, an action request is any activity or step taken, or stimulus provided, by a user (or device) in the system 200 that seeks to induce other users to respond in some fashion, which response will result in some form of data being added to the data store 212. By way of non-limiting examples, action requests 220 may include queries, an invitation to rate/review, etc., all of which may be uniquely identified within the data store 212. In embodiments described below, actions requests may be associated with one or more specific users that created or instantiated the action request.

User data 222 may include any data about a user included in the data store 212, i.e., an included user. For example, such data may include personally identifiable information (PII) or non-personally identifiable information (NPII). As used herein, PII includes any data that can be used to effectively identify a given user. Non-limiting examples of PII include a user's name, residential address, phone number, email address, etc. On the other hand, NPII includes any data that cannot be used on its own to identify a given user, though those having skill in the art will appreciate that NPII can, at times, be cross-referenced with other external data to identify a given user (sometimes referred to as "deanonymization" or "data re-identification"). Non-limiting examples of NPII include a user's age range, telephone area code, postal code, residential city, residential county, residential state, etc. Optionally, NPII may include data that may be derived from PII, such as an age range and electoral district. Further still, as used herein, user data may include any detectable actions (or inactions) taken by a given user within and outside of the communication system. Non-limiting examples of such "action based" user data include a response to any action request (e.g., a survey or query), a product rating, being registered to vote, having obtained a college degree, having scanned a bar code, a response to a social media post (e.g., a Facebook "like"), a query to a search engine, navigating in a browser to a particular website or address, etc. As will be appreciated by those of skill in the art, techniques for ascertaining such actions are well known. Further still, user data 222 may comprise data about users (whether included previously in the data store or not) that is received from third-party sources 216 (i.e., other than the users themselves). Also, as used herein, additional data about a given user may comprise any of the PII or NPII data noted above, as distinguished from responses to action requests.

Figure 3A:
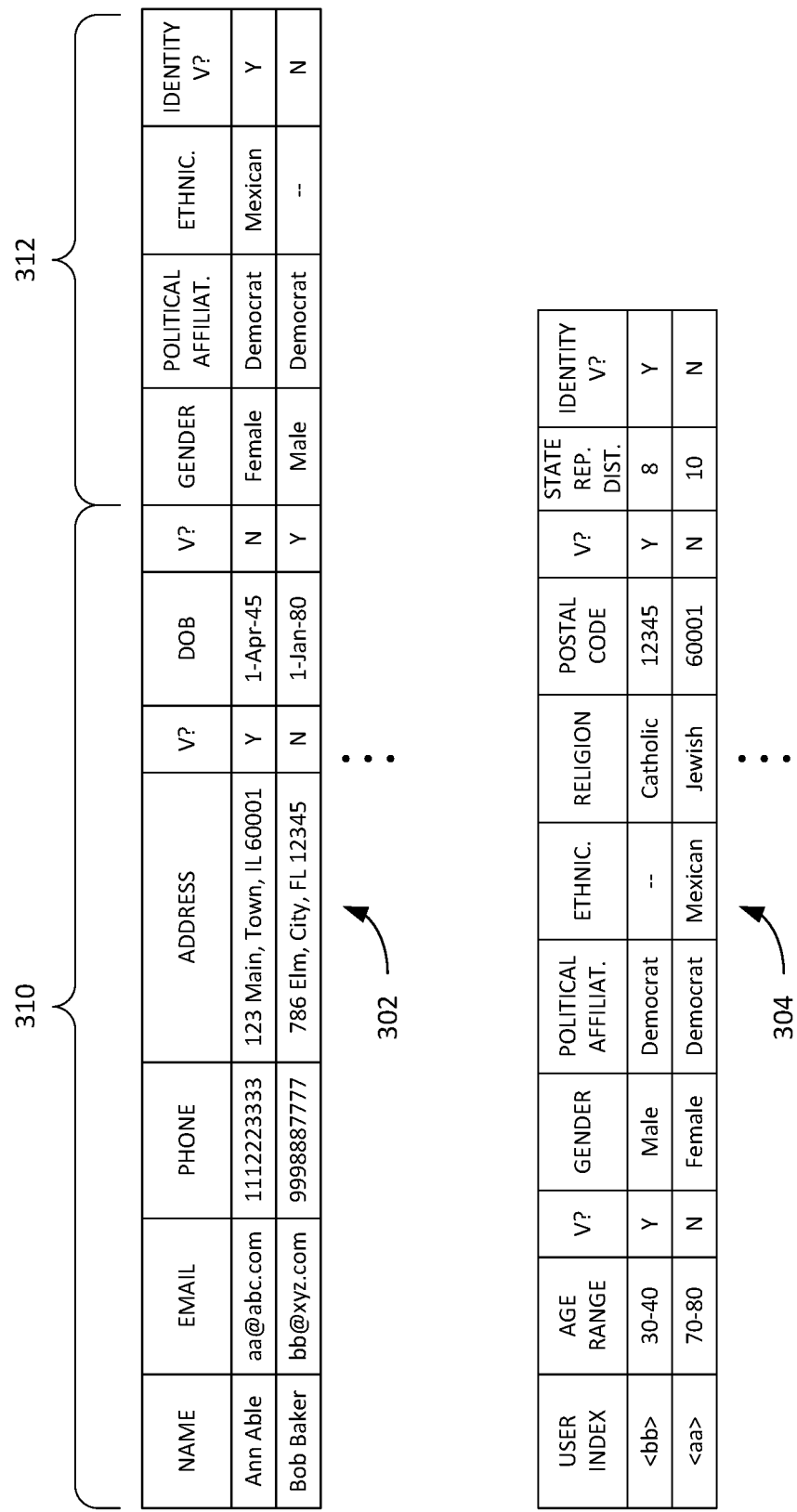

Examples of user data as stored in the data Store 212 are further illustrated with reference to FIGS. 3A-3C. In particular, FIG. 3A illustrates logical representations of user data arranged into a user profile data store 302 and user action data store 304, The schema illustrated in FIG. 3A is based on a schema described in a co-pending U.S. patent application serial number 16/112,252 filed Aug. 24, 2018 and entitled "METHOD AND APPARATUS FOR DISCONNECTION OF USER ACTIONS AND USER IDENTITY" ("the co-pending application"), the teachings of which are incorporated herein by this reference. In the co-pending application, the illustrated schema is designed to maintain separation and disconnection between user profile data and user action data as a means for enhancing privacy of users. While the techniques described herein are compatible with the techniques described in the co-pending application, it is noted that the techniques described in the co-pending application are not required for the instant application.

Referring once again to FIG. 3A, in the illustrated example, the user profile data store 302 includes data for two users, Ann Able and Bob Baker, and includes both PII 310 and NPII 312. Examples of PII 310 include the name, email account, phone number, residential address, and date of birth of each user, whereas examples of NPII 312, in this case, include each user's gender, political affiliation and ethnicity. The fields labeled "V?" following certain data fields indicates whether the preceding data field for a given user has been verified or authenticated. Thus, in the illustrated example, the residential address for Ann Able has been authenticated whereas the residential address for Bob Baker has not. In a similar vein, an identity verification field can be provided indicating whether the identity of the user (as opposed to just specific data for that user) has been verified; in the illustrated example, the identify of only Ann Able has been authenticated.

In the illustrated example, the user action data store 304 includes data for two users who are identified by index values (illustrated as <aa> and <bb> in FIG. 3A) that connect the records in the user action data store 304 to the records in the user profile data store 302. In the illustrated example, various types of NPII user profile data are illustrated including an age range, gender, political affiliation, ethnicity, religion, postal code, and state representative district. Once again, authentication status indicators for individual data fields and/or the user's identity are also provided. Additionally, user action data may include third-party data about a given user, i.e., data received from one of the other data sources 216.

It is not a requirement that all fields for a given user include a value. For example, as shown, an ethnicity for Bob Baker is not provided. As described below, a technique is provided that allows the data manager to obtain such data from a given user. Additionally, it is noted that the potential fields for both user profile and user actions are not limited to the examples shown. In fact, it is anticipated that such fields can be added in an essentially unlimited fashion by virtue of new actions being taken by users and the data manager. Further still, it is once again noted that the arrangement of data fields and records as shown in FIG. 3A is for illustrative purposes only, and that those of ordinary skill in the art will appreciate that other arrangements may be equally employed.

FIG. 3B illustrates an action request table comprising several action requests. In the illustrated embodiment, each record in the action request table includes: an action request identifier (ID) field that uniquely identifies that action request, a creator field for storing the name of the user that created or instantiated the action request, an optional creator organization field that may be used to include an organization name that the creator is affiliated with, a creation date field storing the date the action request was created, an instance ID that uniquely identifies the instance of the action request, an image location field that includes locator information for an image to be included with the action request, a language field specifying a language of the action request, a tags field used to include a classification or category for each action request, an action request field that includes a description of the action request itself, and one or more response option fields (action 1, . . . ) that set forth the possible response options for the corresponding action request. In the illustrated examples, the first two action requests are in the form of queries, "Should the electoral college be abolished?" and "Who's your pick to win the World Series?", whereas the third action request is in the form of user action data (received, for example, from a third-party source via a suitable API) concerning user voter registration status. Note that the response option fields for each action request may include myriad possible values that necessarily depend on the nature of the action request.

FIG. 3C illustrates an action request response table used to store user actions or responses according to the action requests giving rise to the responses. In the illustrated embodiment, each record in the action request response table includes a reference to the instance request ID thereby linking each response to an instance of an action request, a referring source field that identifies a source from which the response was referred (as described below), a user index field that links the response to a particular individual user, a time stamp field that preferably indicates a time the response was received by the data manager 202 and a response field for the action response itself. In this example, a single response from a user identified by index <dd> is stored to the action request ID 12A4C ("Should the electoral college be abolished?"), whereas two responses to action request ID F2390 ("Who's your pick to win the World Series?") from users identified as <ee> and <ff> are stored. By maintaining persistent stored data about individual users, action requests implemented by the data manager as well as a user's response to such action request, the data manager 202 establishes the foundation for the various operations described herein relative to FIGS. 4-10.

Figure 4:
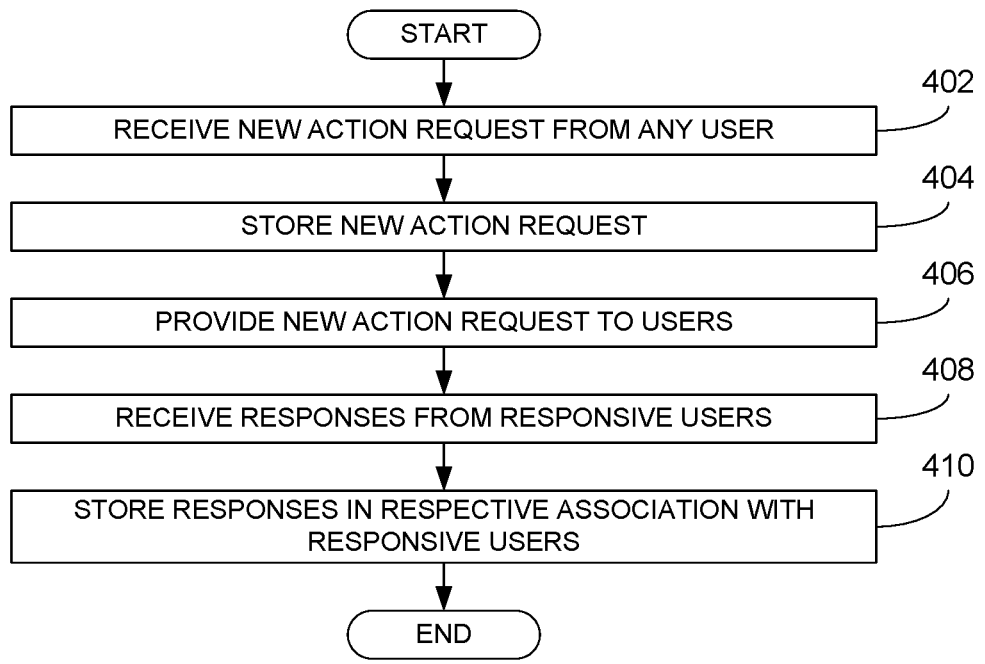
FIGS. 4-9 and 12 are flow charts illustrating processing performed by a data manager in accordance with various embodiments of the teachings of the instant disclosure.

Referring now to FIG. 4, operation in accordance with an embodiment of the instant disclosure is illustrated. In particular, FIG. 4 illustrates operation of the data manager 202 when receiving a new action request from a user. At block 402, the data manager receives a new action request from any user of the plurality of users. As used herein, the plurality of users represents all of those users (and their corresponding devices) that are capable of communicating with the data manager and that might or might not have any data stored in the data store. In contrast, included users are users that already have data stored in the data store relative to the time a new user action request is created. In an embodiment, a new user action request may be created, and thus received, based on a suitable user interface provided by the data manager to the user. In particular, each new action request in this example includes data corresponding to each of the fields illustrated in FIG. 3B. Thus, using a suitable user interface, the user may be prompted to supply the creator, language, action request and response options data and, optionally, the tags and creator organization data. In an embodiment described below, it is also possible for a user to create an instance of an existing action request. Techniques for implementing such user interfaces suitable for creating action requests as described herein are known in the art. A feature of the instant disclosure is that any of the plurality of users is able to communicate with the data manager (e.g., via a suitable web interface) and create a new action request, which may then be made available to at least some of the plurality of users with other action requests. In this manner, any user can effectively cause data to be added to user actions in the data store to the extent that their submitted action request prompts other users to respond.

Thereafter, processing continues at block 404 where the data manager stores the new action request as illustrated, for example, in the action request table of FIG. 3B. Then, at block 406, the data manager provides the new action request to at least some of the plurality of users. Various techniques may be used for this purpose. For example, in the case where the data manager implements a website or the like where any of the plurality of users may access a selection of action requests, the data manager may cause the new action request to be displayed on a user interface of the website (see, e.g., FIG. 8 as described below). In another embodiment, the data manager can provide a user-deployable mechanism corresponding to the new action request. As used herein, a user-deployable mechanism may include any structure that may be used to present the new action request to users such that operation of the user-deployable mechanism by a user will establish communications with the data manager thereby allowing the user to provide a response to the new action request directly to the data manager. For example, in an embodiment, the mechanism may comprise a so-called widget, i.e., a typically small software program that may be represented on a graphical user interface with a suitable control element (e.g., a button or the like) that, when selected or actuated by a user, establishes the user's response. By including such a widget in, for example, a website controlled/implemented by the user, that use is effectively able to provide the new action request to any other users visiting that website. Alternatively, the mechanism may comprise a uniform resource locator (URL) that may likewise be distributed in a similar manner (e.g., via social media posts or the like), which URL will redirect a user to that portion of the data manager website implementing the new action request. Those having skill in the art are familiar with techniques for implementing such user-deployable mechanisms. In yet another embodiment, the mechanism may comprise a one- or two-dimensional bar code that may be included in either an on-line or off-line (e.g., a newspaper or magazine) platform. Using a device equipped with a suitable scanner, a user can scan the bar code and be directed to the data manager or an API as with the other mechanisms. In this manner, the ability to distribute new action requests widely is greatly enhanced. Furthermore, to the extent that the such mechanisms can be provided to anyone seeking to implement the new action request, multiple instances of the same action request can be implemented across diverse platforms. In addition to permitting users to interact with the data manager, such mechanisms may also supply the referring source information illustrated in FIG. 3C to the extent that they are integrated into a website or other platform, or include information designating the referring source.

Referring once again to FIG. 4, processing continues at block 408 where the data manager receives responses to the new action request from responsive users. Again, as described above, the data manager may receive such response in a variety of manners and the instant disclosure is not limited in that regard. Thereafter, at block 410, the data manager stores the response in the data store such that each response is associated with the corresponding responsive user from which it was received. Once again, an example of this is illustrated in FIG. 3C where an index to a user is included in the record for any given response. In the case where a user is not already known to the data manager prior to receiving the response, the data manager may first create a record for that user (see FIG. 3A) based on whatever user-identifying information is available to the data manager, and then link the response to that new user record. As further illustrated in FIG. 3C, each response is preferably time stamped, in accordance with known techniques. In the case where a given user responds to an action request multiple times, it becomes possible to compare responses over time for that individual user or, where such results are aggregated in some form (i.e., across multiple responsive users), to compare aggregated response data at different times.

FIGS. 5-11 illustrate additional processing by the data manager in accordance with the instant disclosure. It is noted that the processes illustrated in each of FIGS. 5-8 and 11 may each be implemented separately from each other and the process illustrated in FIG. 4. However, it is also true that the processes illustrated in each of FIGS. 5-8 and 11 are compatible with each other and the processing illustrated in FIG. 4.

Figure 5:
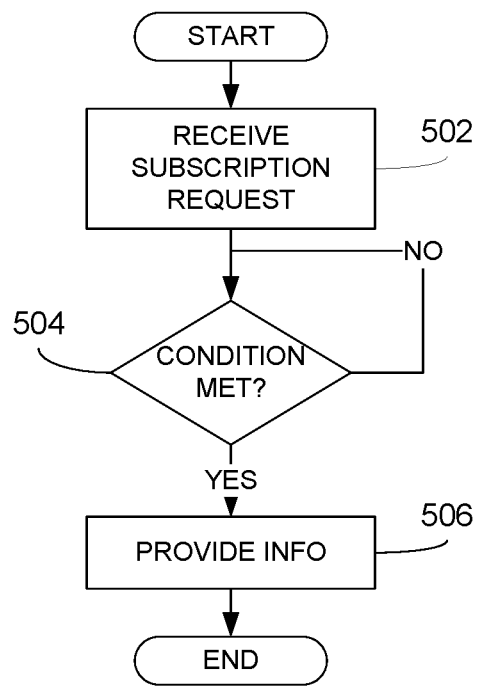

Referring now to FIG. 5, processing begins at block 502 where the data manager receives, from a requesting user, a subscription request for information concerning action requests implemented by the data manager. In particular, the subscription request includes subscription criteria used to identify specific action requests that the requesting user would like to be informed about. For example, in one embodiment, the subscription criteria may include an identification of a specific user whereas, in another embodiment, the subscription criteria may comprise a keyword. Still further examples of suitable criteria will be readily apparent to those skilled in the art. In this manner, when the condition(s) established by a given set of criteria are met by one or more specific action requests, as illustrated at block 504, processing continues at block 506 where information concerning the one or more action requests satisfying the criteria are provided to the requesting user, for example via a suitable user interface or notification. With reference to the noted exemplary criteria, a user could request information for any action requests created by a certain organization, such as a newspaper or television news channel. Alternatively, another user may request information for any action requests concerning a specific topic, such as the "Seattle Seahawks." By combining such criteria, it becomes possible to specifically define action requests of particular interest to a requesting user.

Figure 6:
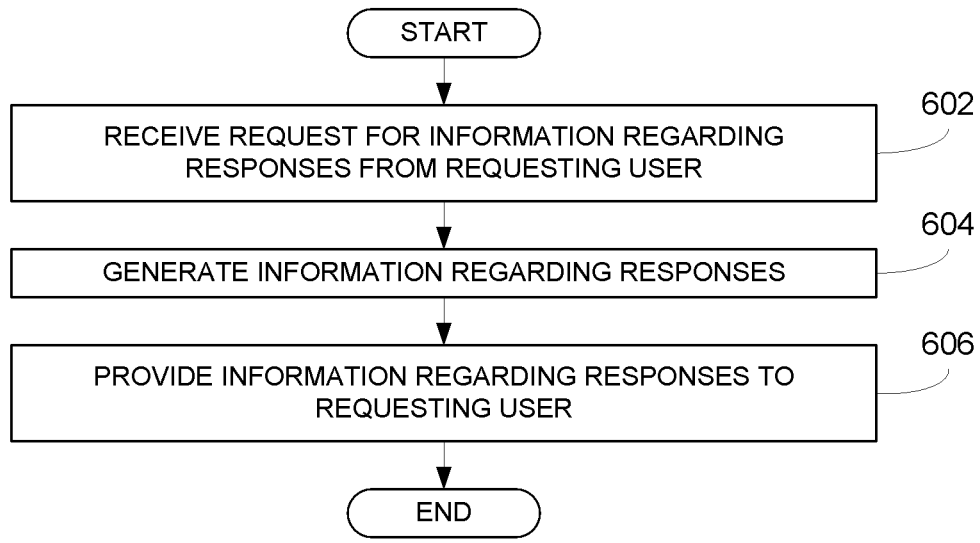

Referring now to FIG. 6, processing begins at block 602 where the data manager receives a request for information regarding responses in the data store from a requesting user. At block 604, the data manager may generate the requested information (in the sense of retrieving the requested data from the data store and, optionally, further processing such data) and thereafter, at block 606, provide the requested information to the requesting user. For example, the data manager can either provide aggregated data to the requesting device or individual user data. For example, and with reference to FIG. 3A, in the case of aggregated data, if a request for data concerning "all users in the 60001 postal code region that believe Trump should be impeached" is received, aggregated data for those users meeting the specific criteria (all users in the 60001 postal code that believe Trump should be impeached) is provided. Thus, aggregated results could be provided in response to the request, e.g., "60% of all users in the 60001 postal code answer yes to 'Should Trump be impeached?'," or "Of the respondents that answered yes to "Should Trump be impeached?' 90% were affiliated with the Democratic party and 83% were female." Alternatively, user action data corresponding to individual records could be generated and provided at blocks 604 and 606. For example, a request for data may ask for the age range and ethnicity for all respondents living in Washington state that answered yes to the query "Should Trump be impeached?" In this case, the requested data for each individual meeting these criteria could be reported.

Figure 7:
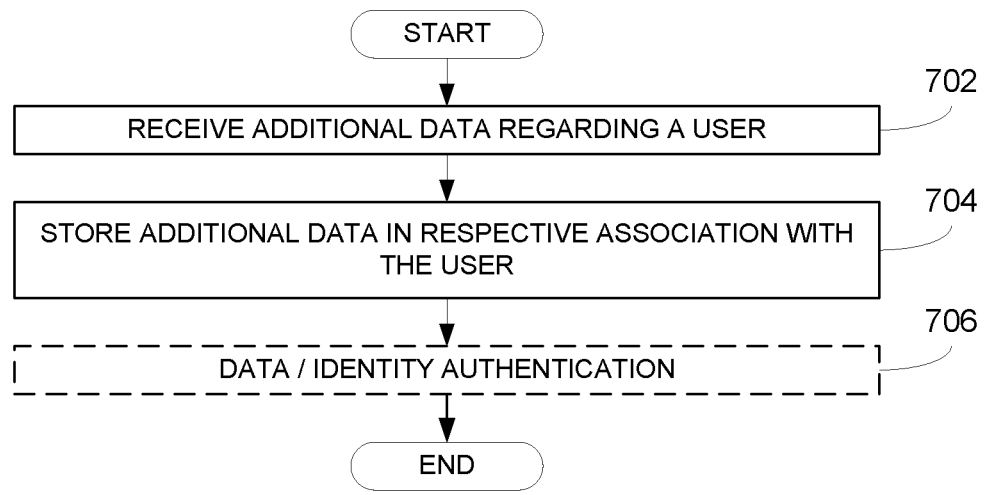

Referring now to FIG. 7, processing begins at block 702 where the data manager receives additional data concerning a given user. As noted above, additional data may comprise any data concerning a user aside from responses to action request. For example, such data may include data that describe specific characteristics about the user, such as preferred customer programs the user participates in, specialized professional qualification about that user, historical information about that user (e.g., what college he/she graduated from), etc. It is noted that such additional data may be received from any of a number of sources and under varying conditions. For example, such additional data may be received from the given user when providing a response to a given action request, or by that user outside the context of providing such a response. Further still, such data may be obtained from third-party sources 216 as in the case, for example, where a retailer, seeking to gain insights about its customers, provides data concerning its customer loyalty program. In this latter case, user-identifying information in the third-party data may be compared with user-identifying information already found in the data store such that any matches in the user-identifying data results in the customer loyalty data being added to existing user records or, where such matches are not found, in the creation of new user records. In this manner, detailed and expansive records concerning individual users may be quickly established through third-party resources. Regardless of the manner in which it is obtained, processing continues at block 704 where the additional data is stored in association with the user.

At block 706, the data manager can optionally authenticate some or all of the user data, i.e., the responses and/or additional data, or the identity of the user based on the responses and/or additional data. Various techniques for performing such authentication or verification are well-known in the art. For example, voter registration status can be verified by third party API services. Further still, home address may be verified by various techniques including AVS (Address Verification System) services from credit card processors, and identity verification services from credit bureaus, such as Experian's "PRECISE ID" service. As will be appreciated by those having skill in the art, various pieces of data have unique methods used to provide verification thereof, and the techniques described herein are not dependent upon the specific verification approach used, nor the point in time of collection or verification of such data. Where possible, data is verified independently and are only considered verified when confirmed by a trusted source. Verification may occur at a later point in time and can also occur over time. For example, a user may provide payment information at a later date, and credit card AVS may then be used to verify their home address. Additionally, it is possible in some instances to authenticate responses to the extent that conflicts between user data may exist. For example, a given user's data may include responses to queries whether that user is registered to vote, or what company that user works at. In this case, the data store may also include third-party data unrelated to the queries concerning voter registration and place of employment. If no conflict exists between these responses and the third-party data, the responses may be considered authenticated. In the event a response does not match with other objective data (in this case, the third-party data), then it may be desirable to inform the user of the discrepancy and encourage him/her to update the necessary data.

Figure 8:
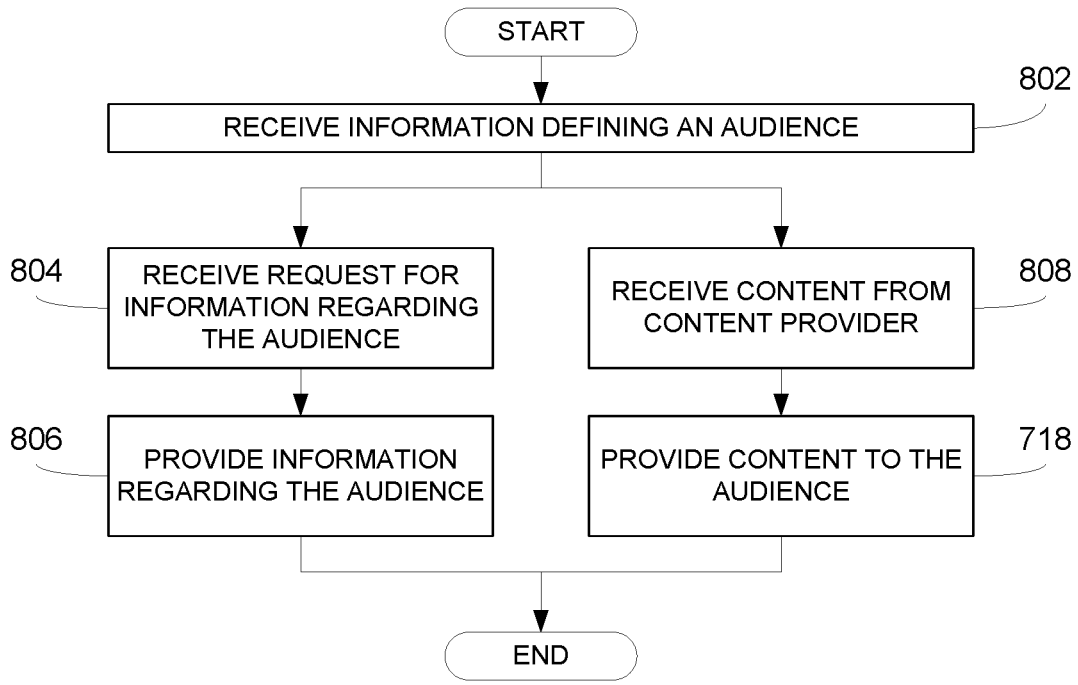

Referring now to FIG. 8, processing begins at block 802, the data manager may receive information defining an audience from a submitting user, where the information defining the audience may comprise criteria based on responses and/or data in the data store corresponding to any of the included users. As used herein, an audience is a logical grouping of any one or more of the included users based on the provided criteria. Such criteria could be based solely on any attributes found in the user profile data such as gender, state of residence, political affiliation, etc. Alternatively, or additionally, such criteria could be based on any attributes found in the user action data such as responses to specific action requests, e.g., any users that responded "undecided" to an election poll, or users that expressed anything less that "satisfied" in online ratings of a given product, or users that have visited (or not) a given webpage, etc. In an embodiment, such audience-defining information could be entered by a user through a suitable web interface, as known in the art, in which the user is provided with lists of the available attributes and potential attribute values. Because such attributes can be expanded and added to over time (and optionally authenticated), as noted above, the availability of such criteria permits submitting users to define an audience with comparatively high degree of precision as opposed to prior art techniques.

As further illustrated in FIG. 8, two parallel paths may be pursued along blocks 804-806 and/or blocks 808-810. At block 804, the data manager may receive, from a requesting user, a request for information concerning the audience defined at block 802. It is noted that the requesting user at block 804 may be the same as the submitting user at block 802, or may be another user. This latter scenario may arise where the criteria defining the audience at block 802 is stored (for example, in the data store) and identified in such a way that it may be later provided to other users for selection. For example, it may be desirable to define separate audiences in a given state and county along political affiliation lines, e.g., one audience defined as residents in Cook county Illinois that are registered Democrats versus another audience defined as residents in Cook county Illinois that are registered Republicans. Once defined, descriptions of these audiences may be presented to any requesting user (e.g., via a suitable user interface) for selection. Furthermore, the requested information regarding the audience may be selected according to any of the available attributes (e.g., user profile data or user action data) represented in the data store. Regardless of the identity of the requesting user and how the audience was selected, processing may continue at block 806 where the data manager generates the requested information (gathers and/or further processes the requested data) and thereafter provides it to the requesting user.

Along the other path, processing may continue at block 808 where the data manager receives, from a content provider, content to be provided to users defined within the audience. Once again, it is noted that the content provider may be the same as the submitting user at block 802, or may be another user as described above. As used herein, content may comprise any materials that can be provided to the audience by the data manager, non-limiting examples of which include electronically-stored advertising materials, recall notices, governmental publications, etc. Thereafter, at block 810, the content is provided by the data manager to the users within the audience. In an embodiment, along with the content, the individual users in the group may be provided with an indication as to why they were provided the content, as well as an invitation to correct any data in the data store. That is, each user in the audience may be informed of the criteria used to define the audience, which the user can then use to determine whether the attributes in the data store are correct or outdated. For example, a given user may receive, from the data manager, an advertisement for heavy-duty boots and is informed that they were targeted (i.e., with the defined audience) due to the fact that their corresponding data in the data stored indicates that they are a member of a trade union. Such information may include a link or other mechanism to a webpage, for example, where they can correct such information as desired. Based on this, the user may come to appreciate that this information is out of date, e.g., the user may no longer be in that trade union, and may thereafter take action to update the corresponding attribute in the data store. In this manner, data in the data store may be continually updated, thereby improving the accuracy thereof.

Figure 9:
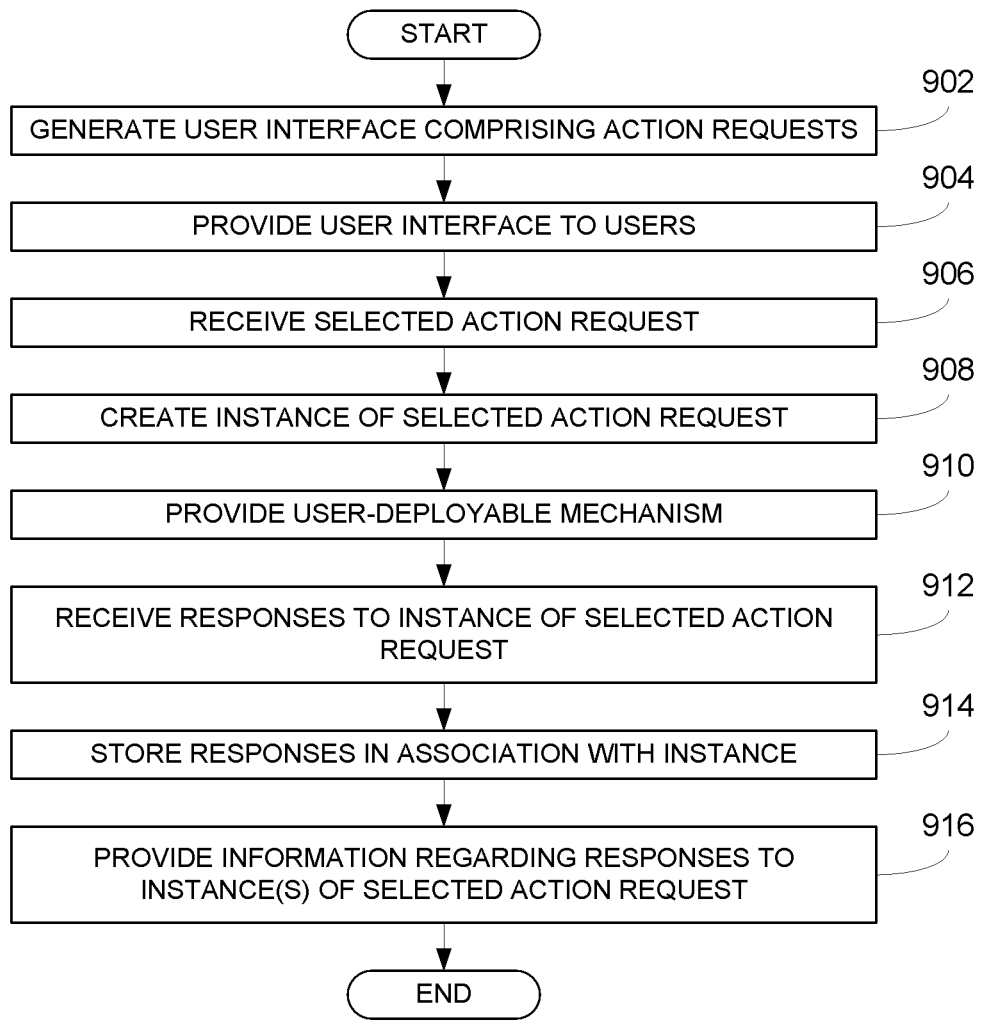

Referring now to FIG. 9, processing begins at block 902 where the data manager generates a user interface comprising at least a portion of the information concerning action requests stored in the data store and, thereafter, at block 904, provides this information (i.e., the user interface) to a user. An example of such an interface 1000 is illustrated in FIG. 10. As shown, the interface may include a number of selector controls 1002 in the form of buttons, combo box, sliders or text boxes. For example, buttons defining temporal criteria ("today," week," "month," "year") are configured, when selected, to cause information about action requests (queries, in the illustrated example) to be fetched and displayed. Similarly, a geographical selector, illustrated as a combo box, may be provided to allow selection of a given geographical attribute for use in filtering action requests to be displayed. As further shown, a horizontal slider may be provided that allows a user to select (or not) only action requests to which the user has previously responded. Further, a text box is provided for initiating searches on stored action requests according to user-defined keywords or text strings. As further shown, multiple category listings (drawn, for example, from the "tags" illustrated in FIG. 3B) may be provided in the form of a list box that allows a user to select a particular category of action requests. Those of skill in the art will appreciate that further user interface control elements could be equally employed to facilitate the filtering and selection of available action requests.

Responsive to any selector 1002, 904 choices made, action requests meeting the filtering requirements are displayed in a presentation field 1006 of the interface 1000. As known in the art, each action request thus displayed may be selectable. In the illustrated example, the information for each action request includes data of the type illustrated in FIG. 3B including, but not limited to, a description thereof (e.g., "How do you rate the movie La La Land?"), a field setting for the name of the user that created or instantiated the action request, an organization that the creating user is affiliated with and a field illustrating the creation date for the action request. The illustrated example also includes a field for each action request indicating its relative popularity as measured by, for example, the number of responses received. In this manner, a user may be presented with a wide variety of available action requests for their own use or perusal. In the event that the user is, for example, unable to locate an existing action request that meets their need or interest, a button 1008 is provided that allows the user to define a new action request as described above relative to block 402.

Referring once again to FIG. 9, processing continues at block 906 where the data manager receives, from the user, an indication of a selected action request from the various action requests provided (displayed) at block 904. Thereafter, at block 908, the data manager creates an instance of the selected action request and associates that instance with the user that created this instance. As shown in FIG. 3B, the data manager creates an instance ID that allows this instance to be uniquely identified. Processing continues at block 910 where the data manager creates a user-deployable mechanism, as described above, that the user can then employ to distribute the action request to multiple users. In turn, at block 912, the data manager receives, according to user selection of the user-deployable mechanism, responses to the instance of the selected action request from responsive users. At block 914, the data manager stores the responses in association with the instance of the selected action request (as well as the responsive user), as illustrated in FIGS. 3B and 3C. Thereafter, at block 916, the data manager provides information regarding the responses received and stored at blocks 912, 914 to various possible users. For example, in one embodiment, the user associated with a given instance of an action request may be provided with information regarding those responses corresponding to only that instance. Alternatively, the information about that specific instance may be provided to users other than the user associated with that instance. Further still, data across multiple instances of the selected action request may be collected and presented to any user. This latter option is particularly powerful to the extent that it facilitates the "sharing" of response results between instances of the same action request, regardless of how those separate instances were distributed.

Figure 11:
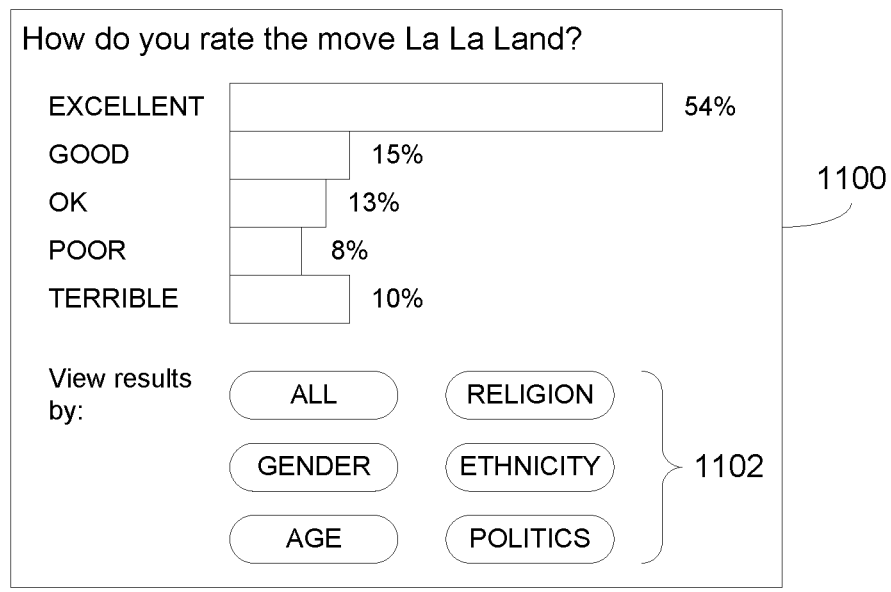
Figure 12:
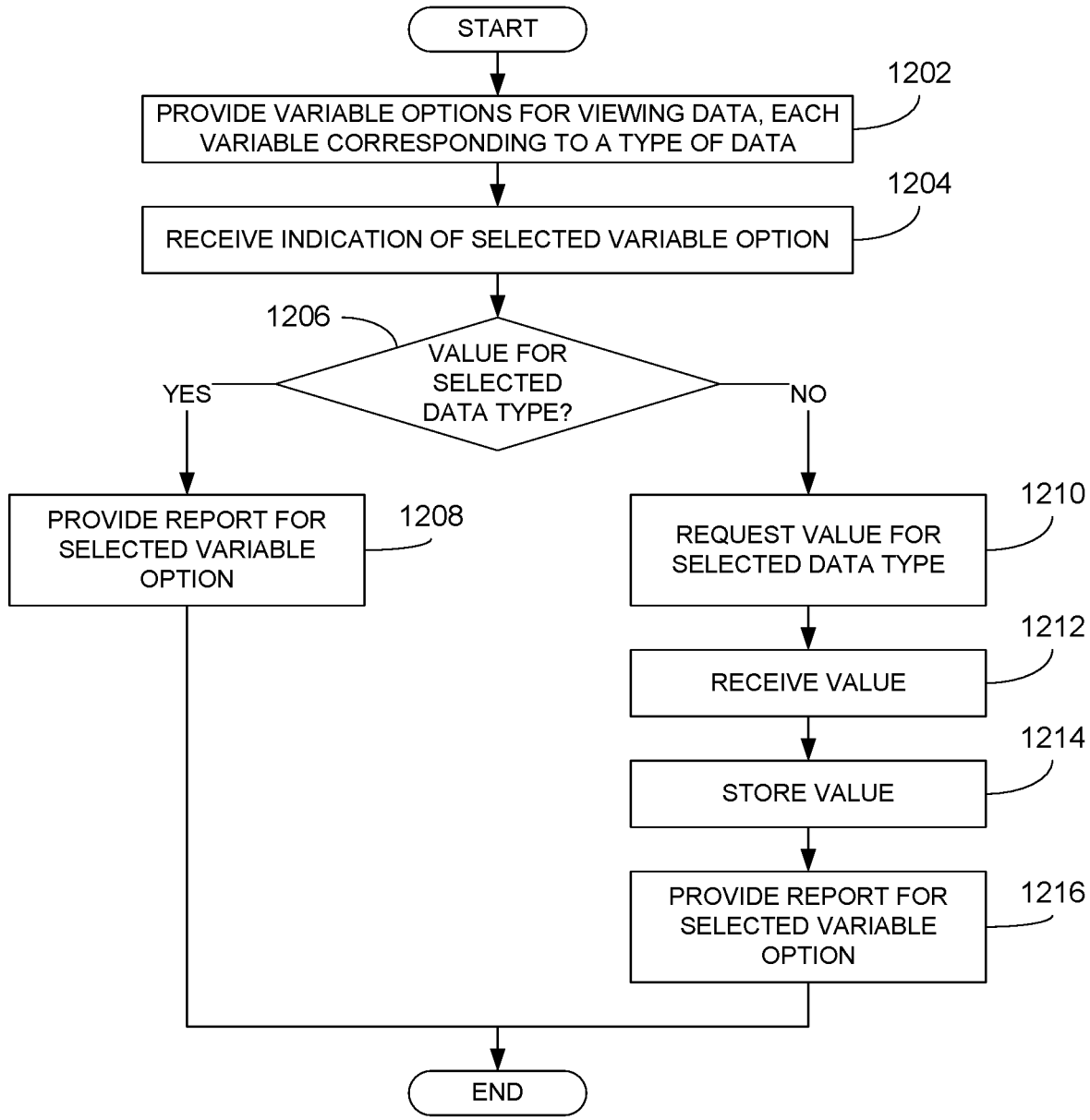

As noted above, there may be occurrences where a given user's data is incomplete. To address this, processing by the data manager in accordance with FIG. 12 may be employed to gather otherwise missing data for a given user. In particular, the processing of FIG. 12 occurs when a request for data is received from a given device. In an embodiment, such a request could be initiated by the device itself, as described above relative to FIG. 4. In the embodiment of FIG. 12, at block 1202, the data manager provides variable options for viewing a report based on the data in the user action data store to the device (through, for example, the provision of suitable graphical user interface). An example of such a user interface 1100 is illustrated in FIG. 11. As shown in FIG. 11, each of the variable options 1102 preferably corresponds to a type of data in the data store. The provision of the variable options could be done in response to a specific action previously taken by a user of the device, e.g., after responding to a survey query, the data manager could provide an interface to the device asking the user whether he/she would like to see the survey results according to the various types of data included in the user action data store. In the illustrated example, the variable options include gender, age range, religion, ethnicity and political affiliation, in addition to an option to view all results without filtering according to a selected variable option.

Thereafter, at block 1204, the data manager receives an indication of a selected variable option from the device and, at block 1206, determines whether data in the data store corresponding to the user includes a value for the type of data corresponding to the selected variable option. For example, and with reference to FIG. 3, if Ann Able provides a selected variable option corresponding to ethnicity in order to view results by ethnicity, the data manager can determine that Ann Ables's data does include a value for the ethnicity data field in the user action data store 304. Conversely, in the case of Bob Baker in this same scenario, the data manager can determine that Bob Baker's data does not include a value for the ethnicity data field in the user action data store 304.

When it is determined that the data field in question does include a value, processing continues at block 1208 where a report of data based on the selected variable option is provided by the data manager back to the device. Alternatively, when it is determined that the data field in question does not include a value, processing continues at block 1210, where the data manager causes a request to be sent to the user, which request asks the user to provide a value for the type of data corresponding to the selected variable option. Thereafter, at block 1212, the data manager receives the requested value and stores it in the data store (as described above) at block 1214. Having thus obtained the missing value, processing continues at block 1216 where the data manager provides the requested report of data back to the user. Though not illustrated in FIG. 12, if the device fails to provide the requested value in response to the request at block 1210, the data manager may decline to provide the requested data to the device.

The technique illustrated in FIG. 12 could be refined such that the data manager only provides variable options for viewing data that correspond to types of data known for the particular user to be lacking a corresponding value. In this way, the data manager is able to more directly cause missing data to be gathered. Further still, the request for a value of a given data type need not be premised on whether a value corresponding to the user already exists in the data store. For example, it may be desirable to make such a request even when such a value already exists, as in the case where it is desired to confirm or update an already existing value.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. In a communication system comprising a publicly-accessible communication network, a plurality of devices operatively connected to the communication network and supporting communication between a corresponding plurality of users, and a data manager operatively connected to the communication network, the data manager implementing a data store comprising a plurality of action requests presented to at least some of the plurality of users, a method for obtaining responses from at least a portion of the plurality of users, the method comprising:
   providing information concerning the plurality of action requests, by the data manager to a first user of the plurality of users via the communication network to a device of the plurality of devices corresponding to the first user;
   receiving, by the data manager, an indication of a selected action request of the plurality of action requests via the communication network from the device corresponding to the first user, the indication responsive to the information concerning the plurality of action requests;
   creating, by the data manager, an instance of the selected action request that is associated with the first user;
   providing, by the data manager to the device corresponding to the first user, a user-deployable mechanism associated with the selected action request to be presented to devices corresponding to other users of the plurality of users;
   receiving, by the data manager responsive to the user-deployable mechanism, responses to the instance of the selected action request, where the data manager receives the responses via the communication network from devices of the plurality of devices corresponding to responsive users of the other users; and
   storing, by the data manager, the responses to the instance of the selected action request in the data store, where each of the responses is associated in the data store with the instance of the selected action request.

2. The method of claim 1, further comprising:
   providing, by the data manager via the communication network to the device corresponding to the first user, information regarding the responses to the instance of the selected action request.

3. The method of claim 1, further comprising:
   providing, by the data manager via the communication network to one or more devices of the plurality of users, information regarding the responses to the instance of the selected action request.

4. The method of claim 1, further comprising:
   providing, by the data manager via the communication network to one or more devices of the plurality of users, information regarding the responses to a plurality of instances of the selected action request.

5. The method of claim 1, wherein providing the information concerning the plurality of action requests to the first user further comprises:
   generating, by the data manager, a user interface comprising the information concerning the plurality of action requests; and
   providing the user interface, by the data manager, to the first user via the communication network and the device corresponding to the first user.

6. The method of claim 1, further comprising:
   providing, by the data manager via the communication network to one or more devices of the plurality of users, information regarding responses by the responsive users to action requests unrelated to the instance of the selected action request.

7. A data manager operatively connected to a publicly-accessible communication network, a plurality of devices being operatively connected to the communication network and supporting communication between a corresponding plurality of users, the data manager implementing a data store comprising a plurality of action requests presented to at least some of the plurality of users, the data manager for use in obtaining responses from at least a portion of the plurality of users, the data manager comprising:
   at least one processor; and
   machine readable storage, operatively connected to the at least one processor and having stored thereon instructions that, when executed by the at least processor cause the at least one processor to:
   provide information concerning the plurality of action requests to a first user of the plurality of users via the communication network to a device of the plurality of devices corresponding to the first user;
   receive, via the communication network from the device corresponding to the first user and responsive to the information concerning the plurality of action requests, an indication of a selected action request of the plurality of action requests;
   create an instance of the selected action request that is associated with the first user;
   provide, via the communication network to the device corresponding to the first user, a user-deployable mechanism associated with the selected action request to be presented to devices corresponding to other users of the plurality of users;
   receive, responsive to the user-deployable mechanism, responses to the instance of the selected action request via the communication network from devices of the plurality of devices corresponding to responsive users of the other users; and
   store the responses to the instance of the selected action request in the data store, where each of the responses is associated in the data store with the instance of the selected action request.

8. The data manager of claim 7, the machine-readable storage further comprising instructions that, when executed by the at least one processor, cause the at least one processor to:

provide, via the communication network to the device corresponding to the first user, information regarding the responses to the instance of the selected action request.

9. The data manager of claim 7, the machine-readable storage further comprising instructions that, when executed by the at least one processor, cause the at least one processor to:

provide, via the communication network to one or more devices of the plurality of users, information regarding the responses to the instance of the selected action request.

10. The data manager of claim 7, the machine-readable storage further comprising instructions that, when executed by the at least one processor, cause the at least one processor to:

provide, via the communication network to one or more devices of the plurality of users, information regarding the responses to a plurality of instances of the selected action request.

11. The data manager of claim 7, wherein those instructions that cause the at least one processor to provide the at least a portion of the information concerning the plurality of action requests to the first user are further operative to cause the at least one processor to:

generate a user interface comprising the information concerning the plurality of action requests; and provide the user interface to the first user via the communication network and the device corresponding to the first user.

12. The data manager of claim 7, wherein the machine readable storage further comprises instructions that, when executed by the at least processor cause the at least one processor to:

provide, via the communication network to one or more devices of the plurality of users, information regarding responses by the responsive users to action requests unrelated to the instance of the selected action request.

13. In a communication system comprising a publicly-accessible communication network, a plurality of devices operatively connected to the communication network and supporting communication between a corresponding plurality of users, and a data manager operatively connected to the communication network, the data manager implementing a data store comprising a plurality of action requests presented to at least some of the plurality of users, a method for obtaining responses from at least a portion of the plurality of users, the method comprising:

receiving, by a first user of the plurality of users from the data manager via the communication network and a device of the plurality of devices corresponding to the first user, information concerning the plurality of action requests;

receiving, by the device corresponding to the first user, an indication of a selected action request of the plurality of action requests;

providing, by the device corresponding to the first user to the data manager via the communication network, the indication of the selected action request;

receiving, by the device corresponding to the first user from the data manager, a user-deployable mechanism associated with the selected action request to be presented to devices corresponding to other users of the plurality of users; and presenting, by the device corresponding to the first user, the user-deployable mechanism to the devices corresponding to the other users.

14. A device of a plurality of devices operatively connected to a publicly-accessible communication network supporting communication between a corresponding plurality of users, the device corresponding to a first user of the plurality of users, wherein a data manager is operatively connected to the communication network, the data manager implementing a data store comprising a plurality of action requests presented to at least some of the plurality of users, the device for use in obtaining responses from at least a portion of the plurality of users, the device comprising:

at least one processor; and machine readable storage, operatively connected to the at least one processor and having stored thereon instructions that, when executed by the at least processor cause the at least one processor to:

receive, from the data manager via the communication network, information concerning the plurality of action requests;

receive an indication of a selected action request of the plurality of action requests;

provide, to the data manager via the communication network, the indication of the selected action request;

receive, from the data manager, a user-deployable mechanism associated with the selected action request to be presented to devices corresponding to other users of the plurality of users; and presenting the user-deployable mechanism to the devices corresponding to the other users.

* * * * *